United States Patent
Zhang et al.

(10) Patent No.: US 9,121,292 B2
(45) Date of Patent: Sep. 1, 2015

(54) AIRFOIL AND A METHOD FOR COOLING AN AIRFOIL PLATFORM

(71) Applicant: General Electric Company, Schenectady, NY (US)

(72) Inventors: Xiuzhang James Zhang, Simpsonville, SC (US); Stephen Paul Wassynger, Simpsonville, SC (US); Aaron Ezekiel Smith, Simpsonville, SC (US); Anthony Louis Giglio, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 427 days.

(21) Appl. No.: 13/705,804

(22) Filed: Dec. 5, 2012

(65) Prior Publication Data
US 2014/0154063 A1   Jun. 5, 2014

(51) Int. Cl.
    *F01D 5/18*      (2006.01)

(52) U.S. Cl.
    CPC ........... *F01D 5/187* (2013.01); *F01D 5/186* (2013.01); *F05D 2240/81* (2013.01); *Y02T 50/673* (2013.01); *Y02T 50/676* (2013.01)

(58) Field of Classification Search
    CPC ......... F01D 5/182; F01D 5/186; F01D 5/187; F01D 9/06; F01D 9/065; F05D 2240/81; F05D 2260/20; F05D 2260/202; F05D 2260/203
    USPC ............ 415/115, 116; 416/96 R, 96 A, 97 R, 416/193 A
See application file for complete search history.

(56) References Cited

U.S. PATENT DOCUMENTS

| | | | |
|---|---|---|---|
| 5,344,283 A * | 9/1994 | Magowan et al. ............ 415/115 |
| 5,382,135 A | 1/1995 | Green |
| 6,210,111 B1 | 4/2001 | Liang |
| 6,431,833 B2 | 8/2002 | Jones |
| 6,478,540 B2 | 11/2002 | Abuaf et al. |
| 7,147,439 B2 | 12/2006 | Jacala et al. |
| 7,309,212 B2 | 12/2007 | Itzel et al. |
| 7,416,391 B2 | 8/2008 | Veltre et al. |
| 8,221,055 B1 | 7/2012 | Liang |
| 2005/0100437 A1 | 5/2005 | Phillips et al. |
| 2007/0116574 A1* | 5/2007 | Itzel et al. ................. 416/193 A |

(Continued)

FOREIGN PATENT DOCUMENTS

| | | |
|---|---|---|
| EP | 1469163 A2 | 10/2004 |
| WO | 9417285 A1 | 8/1994 |

OTHER PUBLICATIONS

EP Search Report and Written Opinion issued Mar. 19, 2014 in connection with corresponding EP Patent Application No. 13194035.5.

*Primary Examiner* — Christopher Verdier
(74) *Attorney, Agent, or Firm* — Dority & Manning, PA

(57) ABSTRACT

An airfoil includes an outer surface having a leading edge, a trailing edge downstream from the leading edge, and a convex surface between the leading and trailing edges. A cavity is inside the outer surface, and a platform is connected to the outer surface and defines a top surface around at least a portion of the outer surface. A first plurality of trenches is beneath the top surface of the platform upstream from the leading edge, wherein each trench in the first plurality of trenches is in fluid communication with the cavity inside the outer surface. A first plurality of cooling passages provide fluid communication from the first plurality of trenches through the top surface of the platform.

16 Claims, 5 Drawing Sheets

(56) References Cited

U.S. PATENT DOCUMENTS

2008/0298975 A1 12/2008 James et al.
2009/0202339 A1 8/2009 Torii et al.
2010/0135772 A1 6/2010 Liang
2010/0322767 A1 12/2010 Nadvit et al.

* cited by examiner

AIRFOIL AND A METHOD FOR COOLING AN AIRFOIL PLATFORM

FIELD OF THE INVENTION

The present invention generally involves an airfoil and a method for cooling an airfoil platform.

BACKGROUND OF THE INVENTION

Turbines are widely used in a variety of aviation, industrial, and power generation applications to perform work. Each turbine generally includes alternating stages of circumferentially mounted stationary vanes and rotating blades. Each stationary vane and rotating blade may include an airfoil connected to a platform. A compressed working fluid, such as steam, combustion gases, or air, flows along a gas path across the stationary vanes and rotating blades in the turbine. The stationary vanes accelerate and direct the compressed working fluid onto the subsequent stage of rotating blades to impart motion to the rotating blades and perform work.

Increased temperatures of the compressed working fluid generally improve the performance, efficiency, and/or output of the turbine. However, the increased temperatures may also lead to increased erosion, creep, and/or low cycle fatigue to the airfoils and platforms of the stationary vanes and rotating blades. A cooling media released through the airfoils and/or platforms may provide film cooling across these surfaces, and trenches in the airfoils and/or platforms may enhance even distribution of the cooling media across these surfaces. However, erosion or other damage to the trenches may lead to streaming of the cooling media across the airfoils and/or platforms, resulting in uneven cooling of the airfoils and/or platforms. Therefore, an improved airfoil and method for cooling an airfoil platform that varies the distribution of the cooling media across the external surfaces of the airfoils and/or platforms would be useful.

BRIEF DESCRIPTION OF THE INVENTION

Aspects and advantages of the invention are set forth below in the following description, or may be obvious from the description, or may be learned through practice of the invention.

One embodiment of the present invention is an airfoil that includes an outer surface having a leading edge, a trailing edge downstream from the leading edge, and a convex surface between the leading and trailing edges. A cavity is inside the outer surface, and a platform is connected to the outer surface and defines a top surface around at least a portion of the outer surface. A first plurality of trenches is beneath the top surface of the platform upstream from the leading edge, wherein each trench in the first plurality of trenches is in fluid communication with the cavity inside the outer surface. A first plurality of cooling passages provide fluid communication from the first plurality of trenches through the top surface of the platform.

Another embodiment of the present invention is an airfoil that includes an outer surface having a leading edge, a trailing edge downstream from the leading edge, and a convex surface between the leading and trailing edges. A cavity is inside the outer surface, and a platform is connected to the outer surface and defines a top surface around at least a portion of the outer surface. A plenum inside the platform is in fluid communication with the cavity and includes a plurality of separate chambers. A first plurality of trenches is beneath the top surface of the platform upstream from the leading edge, wherein each trench in the first plurality of trenches is substantially parallel with the top surface of the platform and in fluid communication with the plenum. A first plurality of cooling passages provide fluid communication from the first plurality of trenches through the top surface of the platform.

In yet another embodiment, a turbine includes a casing and a plurality of airfoils circumferentially arranged inside the casing. Each airfoil includes an outer surface having a leading edge, a trailing edge downstream from the leading edge, and a convex surface between the leading and trailing edges. A cavity is inside each airfoil, and a platform is connected to the outer surface of each airfoil and defines a top surface around at least a portion of the outer surface of each airfoil. A first plurality of trenches is beneath the top surface of each platform upstream from the leading edge, wherein each trench in the first plurality of trenches is in fluid communication with the cavity inside each airfoil. A first plurality of cooling passages provide fluid communication from the first plurality of trenches through the top surface of each platform.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
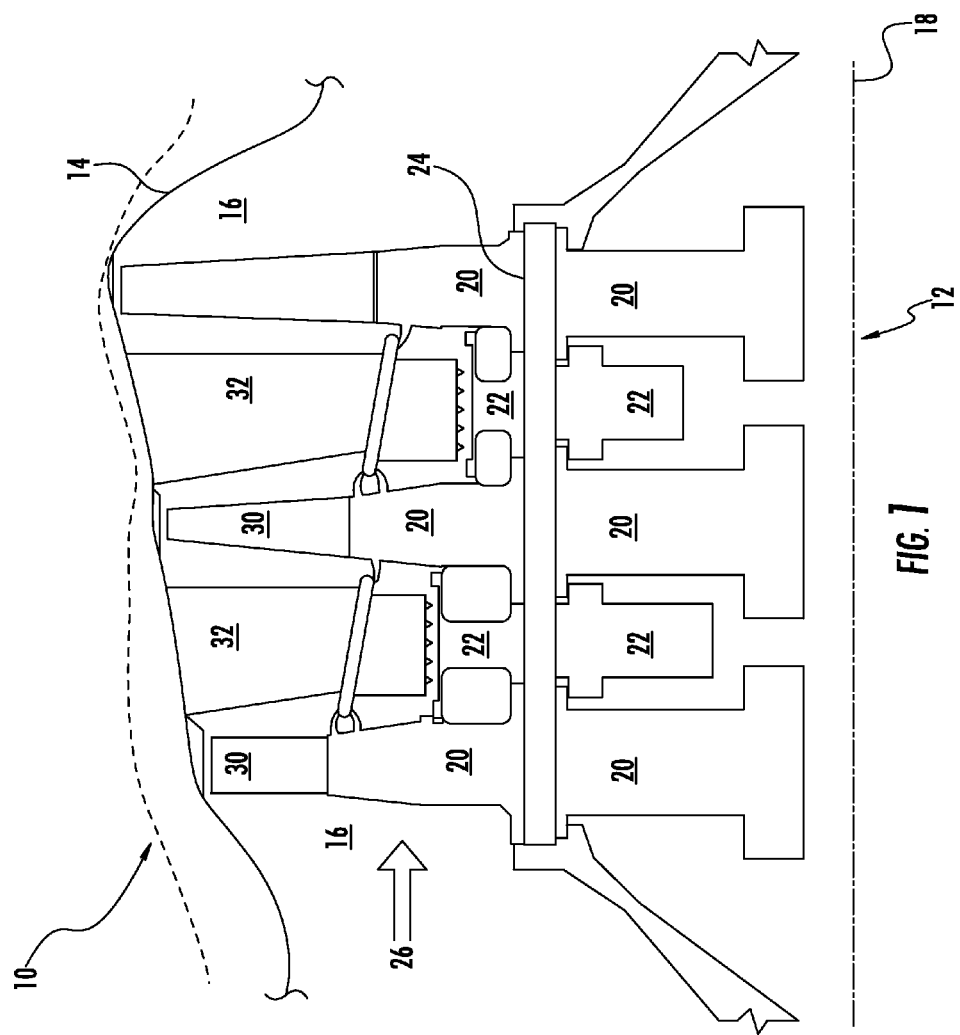
FIG. 1 is a simplified cross-section view of an exemplary turbine that may incorporate various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof For instance, features illustrated or described as part of one embodiment may be used on another embodiment to yield a still further embodiment. Thus, it is intended that the present invention covers such modifications and variations as come within the scope of the appended claims and their equivalents.

Referring now to the drawings, wherein identical numerals indicate the same elements throughout the figures, FIG. 1 provides a simplified side cross-section view of an exemplary turbine 10 according to various embodiments of the present invention. As shown in FIG. 1, the turbine 10 generally includes a rotor 12 and a casing 14 that at least partially define a gas path 16 through the turbine 10. The rotor 12 is generally aligned with an axial centerline 18 of the turbine 10 and may be connected to a generator, a compressor, or another machine to produce work. The rotor 12 may include alternating sections of rotor wheels 20 and rotor spacers 22 connected together by a bolt 24 to rotate in unison. The casing 14 circumferentially surrounds at least a portion of the rotor 12 to contain a compressed working fluid 26 flowing through the gas path 16. The compressed working fluid 26 may include, for example, combustion gases, compressed air, saturated steam, unsaturated steam, or a combination thereof.

As shown in FIG. 1, the turbine 10 further includes alternating stages of rotating blades 30 and stationary vanes 32 circumferentially arranged inside the casing 14 and around the rotor 12 to extend radially between the rotor 12 and the casing 14. The rotating blades 30 are connected to the rotor wheels 20 using various means known in the art. In contrast, the stationary vanes 32 may be peripherally arranged around the inside of the casing 14 opposite from the rotor spacers 22. Each rotating blade 30 and stationary vane 32 generally has an airfoil shape, with a concave pressure side, a convex suction side, and leading and trailing edges, as is known in the art. The compressed working fluid 26 flows along the gas path 16 through the turbine 10 from left to right as shown in FIG. 1. As the compressed working fluid 26 passes over the first stage of rotating blades 30, the compressed working fluid expands, causing the rotating blades 30, rotor wheels 20, rotor spacers 22, bolt 24, and rotor 12 to rotate. The compressed working fluid 26 then flows across the next stage of stationary vanes 32 which accelerate and redirect the compressed working fluid 26 to the next stage of rotating blades 30, and the process repeats for the following stages. In the exemplary embodiment shown in FIG. 1, the turbine 10 has two stages of stationary vanes 32 between three stages of rotating blades 30; however, one of ordinary skill in the art will readily appreciate that the number of stages of rotating blades 30 and stationary vanes 32 is not a limitation of the present invention unless specifically recited in the claims.

Figure 2:
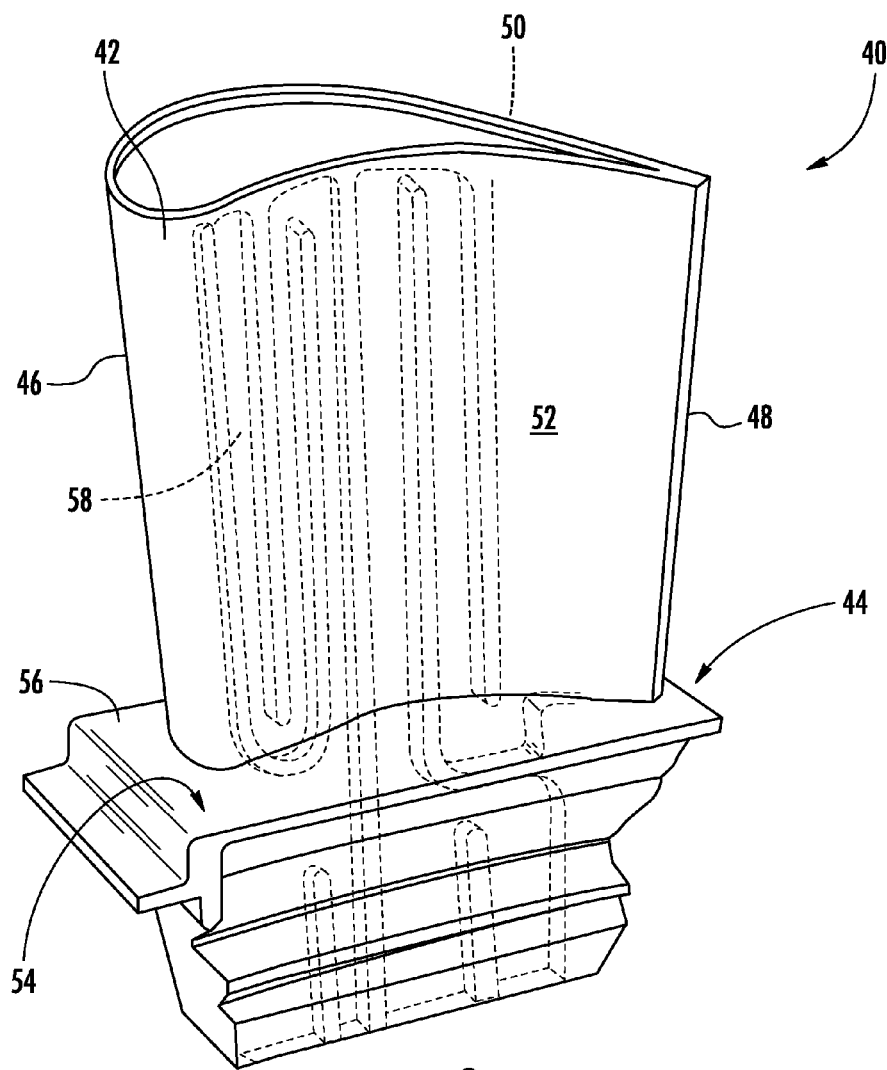
FIG. 2 is a perspective view of an airfoil shown in FIG. 1 according to one embodiment of the present invention.

FIG. 2 provides a perspective view of an airfoil 40 shown in FIG. 1 according to one embodiment of the present invention. The airfoil 40 may be incorporated into the rotating blade 30 or stationary vane 32 in the turbine 10 to convert kinetic energy associated with the compressed working fluid 26 into mechanical energy, as previously described. As shown in FIG. 2, the airfoil 40 generally includes an outer surface 42 connected to a platform 44. The outer surface 42 generally defines an aerodynamic shape having a leading edge 46 and a trailing edge 48 downstream from the leading edge 46. A convex surface 50 opposed to a concave surface 52 between the leading and trailing edges 46, 48 provide the aerodynamic shape over which the compressed working fluid 26 flows.

The platform 44 generally defines a top surface 54 around at least a portion of the outer surface 42 that generally serves as the radial boundary for the gas path 16 inside the turbine 10. In particular embodiments, some or all of the top surface 54 of the platform 44 may include a thermal barrier coating 56 to enhance thermal protection of the top surface 54. The thermal barrier coating 56 may have one or more of the following characteristics: low emissivity or high reflectance for heat, a smooth finish, and good adhesion to the underlying top surface 54. For example, thermal barrier coatings known in the art include metal oxides, such as zirconia ($ZrO_2$), partially or fully stabilized by yttrium oxide ($Y_2O_3$), magnesia (MgO), or other noble metal oxides. The selected thermal barrier coating 56 may be deposited by conventional methods using air plasma spraying (APS), low pressure plasma spraying (LPPS), or a physical vapor deposition (PVD) technique, such as electron beam physical vapor deposition (EBPVD), which yields a strain-tolerant columnar grain structure. The selected thermal barrier coating 56 may also be applied using a combination of any of the preceding methods to form a tape which is subsequently transferred for application to the underlying substrate, as described, for example, in U.S. Pat. No. 6,165,600, assigned to the same assignee as the present invention. However, one of ordinary skill in the art will readily appreciate that the specific materials and application methods for the thermal barrier coating 56 are not limitations of the present invention unless specifically recited in the claims.

Figure 3:
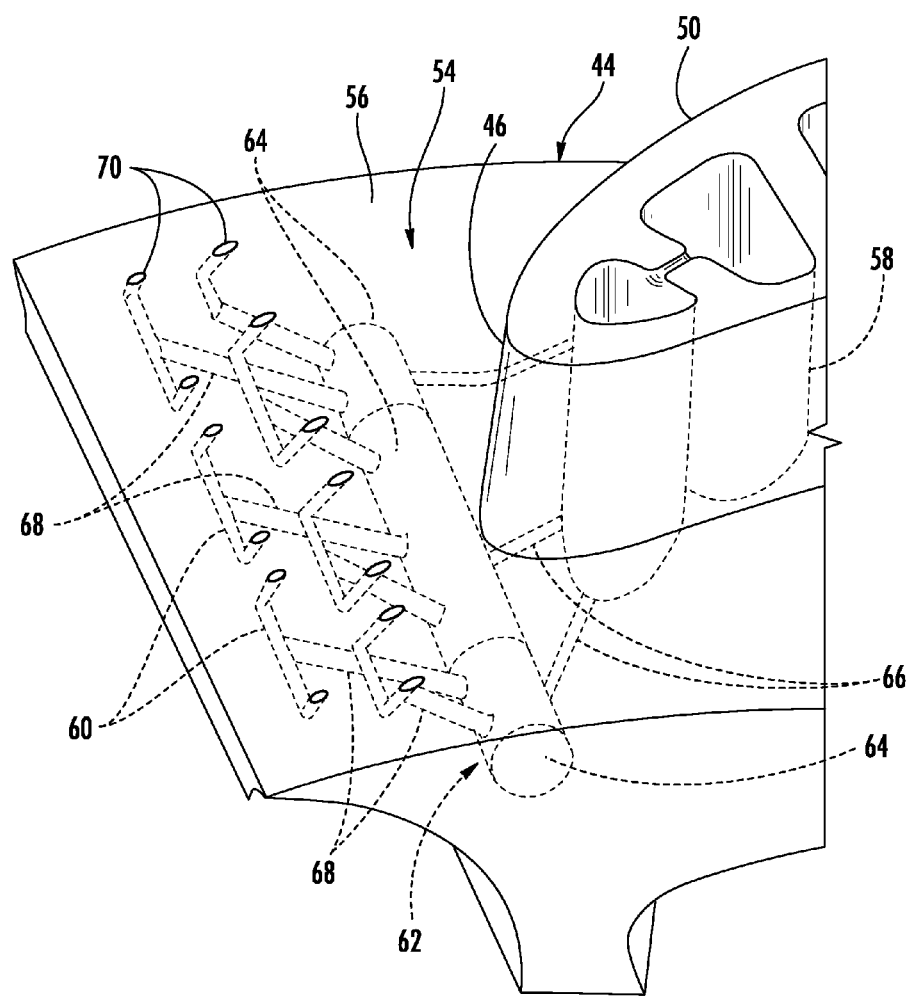
FIG. 3 is an enlarged perspective view of the front of the airfoil shown in FIG. 2.
Figure 4:
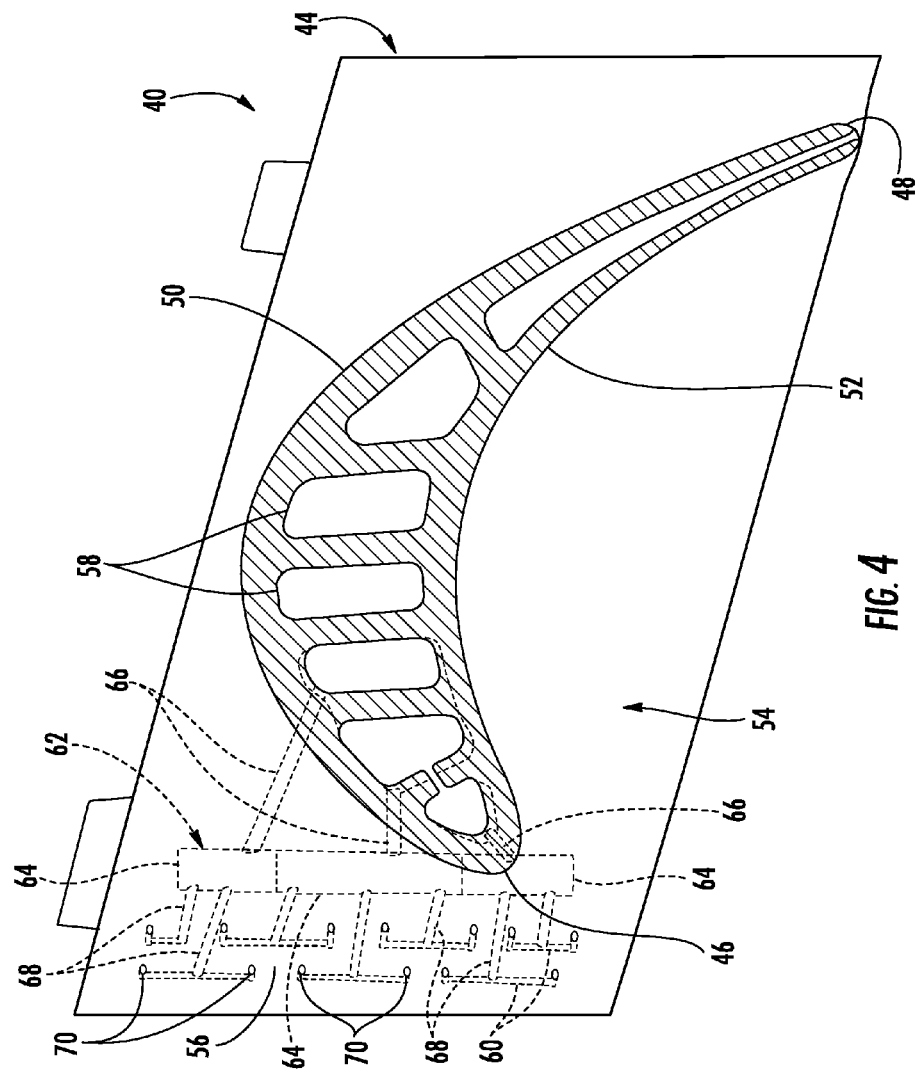
FIG. 4 is a top plan view of the airfoil shown in FIG. 2.

FIG. 3 provides an enlarged perspective view of the front of the airfoil 40, and FIG. 4 provides a top plan view of the airfoil 40 shown in FIG. 2. As shown in phantom in FIGS. 2-4, the airfoil 40 may include a cavity 58 inside the outer surface 42 in fluid communication with a series of trenches 60 beneath the top surface 54 of the platform 44. The cavity 58 may be formed by various methods known in the art, such as casting, molding, or extrusion. In particular embodiments, the cavity 58 may define a serpentine path inside the outer surface 42, and a cooling media, such as air or steam, may flow through the cavity 58 to convectively and/or conductively remove heat from the outer surface 42 of the airfoil 40.

The trenches 60 may be formed in the platform 44 by various methods known in the art, such as drilling, grinding, or using electron discharge machining (EDM) techniques. The trenches 60 may be located anywhere on the platform 44, may be straight or arcuate, may have varying lengths, widths, and/or depths, and may be aligned or staggered with respect to one another to alter the distribution of the cooling media flow through the trenches 60. As shown most clearly in FIGS. 3 and 4, for example, the trenches 60 may be arranged in staggered or overlapping rows that extend substantially parallel to the top surface 54 transversely across the platform 44 and upstream from the leading edge 46.

As further shown in phantom in FIGS. 3 and 4, a plenum 62 inside the platform 44 may provide fluid communication between various parts of the cavity 58 and the trenches 60. In particular embodiments, the plenum 62 may be divided into multiple chambers 64, and each chamber 64 may connect a specific portion of the cavity 58 to a specific group of trenches 60. For example, a first group of supply passages 66 may provide fluid communication between different sections of the cavity 58 and separate chambers 64 in the plenum 62, and a second group of supply passages 68 may provide fluid communication between the separate chambers 64 in the plenum 62 and specific trenches 60. The pressure of the cooling media flowing inside the cavity 58 will vary slightly depending on the location in the cavity 58. As a result, the pressure and flow rate of the cooling media supplied to each chamber 64 and from each chamber 64 to each trench 60 will vary based on the location that the first group of supply passages 66 taps into the cavity 58. In this manner, the combination of the chambers 64 in the plenum 62 and associated first and second groups of supply passages 66, 68 may enable more cooling media to be supplied to particular trenches 60 exposed to higher temperatures or that historically experience higher erosion, creep, and/or low cycle fatigue.

The cooling media supplied to the trenches 60 provides conductive and/or convective cooling to the top surface 54 and/or thermal barrier coating 56 (if present) to reduce erosion, creep, and/or low cycle fatigue. In addition, each trench 60 may include one or more cooling passages 70 that provide fluid communication from the trench 60 through the top surface 54 of the platform 44. As shown in FIGS. 3 and 4, the cooling passages 70 may be staggered transversely across the top surface 54 of the platform 44 to more evenly distribute the cooling media as a film across the top surface 54.

Figure 5:
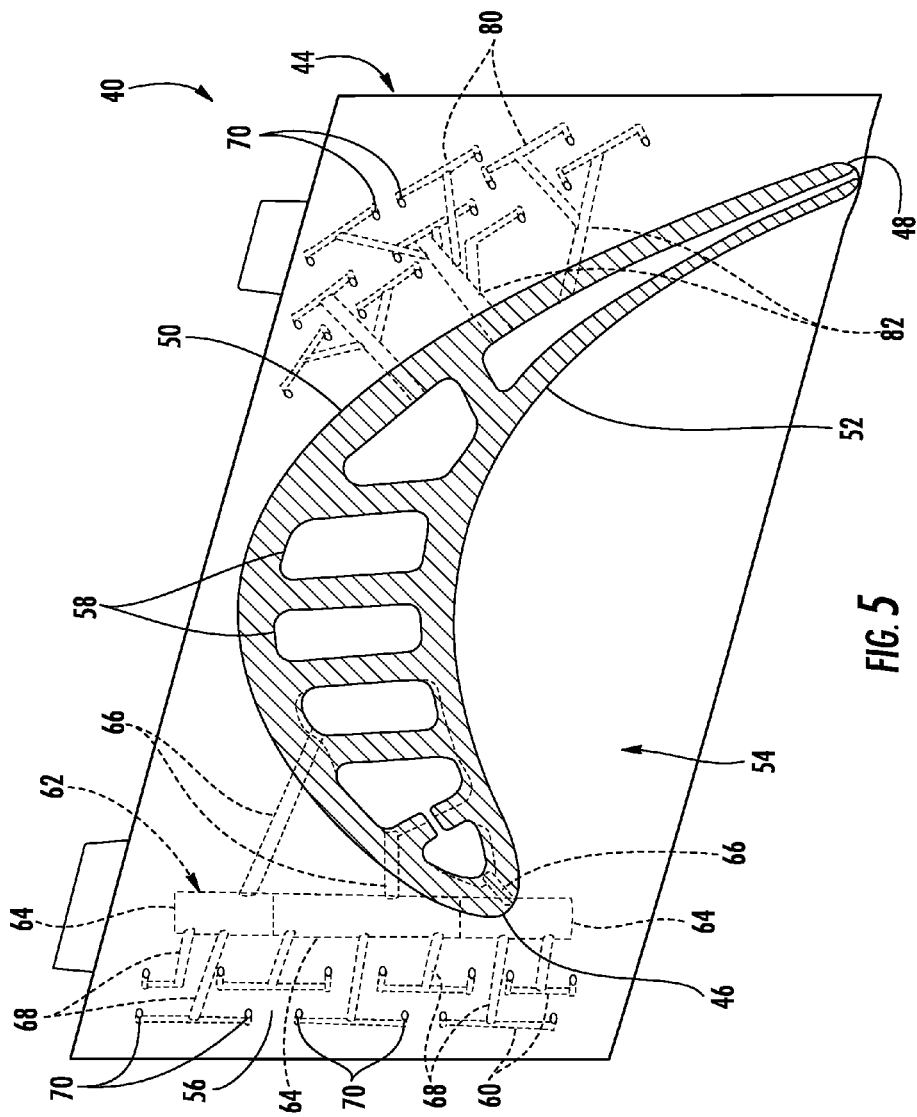
FIG. 5 is a top plan view of the airfoil shown in FIG. 2 according to an alternate embodiment of the present invention.

FIG. 5 provides a top plan view of the airfoil 40 shown in FIG. 2 according to an alternate embodiment of the present invention. As shown in FIG. 5, the airfoil 40 may again generally include the outer surface 42, platform 44, and top surface 54 as previously described with respect to the embodiment shown in FIG. 2. In addition, as shown in phantom in FIG. 5, the airfoil 40 may also include the cavity 58, trenches 60, and cooling passages 70 as previously described with respect to the embodiment shown in FIGS. 3 and 4. In the particular embodiment shown in FIG. 5, the airfoil 40 additionally includes trenches 80 beneath the top surface 54 of the platform 44 downstream from the leading edge 46 and adjacent to the convex surface 50. The trenches 80 may again be arranged in staggered or overlapping rows that extend substantially parallel to the top surface 54. In addition, a third group of supply passages 82 may provide fluid communication between different sections of the cavity 58 and one or more trenches 80 to vary the pressure and flow rate of the cooling media supplied to each trench 80, as previously described with respect to the embodiment shown in FIGS. 3 and 4. In this manner, the cooling media supplied to the trenches 80 provides conductive and/or convective cooling to the top surface 54 and/or thermal barrier coating 56 (if present) to reduce erosion, creep, and/or low cycle fatigue. In addition, each trench 80 may include one or more cooling passages 70 that provide fluid communication from the trench 80 through the top surface 54 of the platform 44. As shown in FIG. 5, the cooling passages 70 may be staggered longitudinally and/or transversely across the top surface 54 of the platform 44 to more evenly distribute the cooling media as a film across the top surface 54.

The embodiments described and illustrated in FIGS. 1-5 may thus provide a method for cooling the platform 44 of the airfoil 40. The method may include flowing the cooling media through at least a portion of the cavity 58 inside the outer surface 42 of the airfoil 40 and then flowing a portion of the cooling media through the trenches 60 beneath the top surface 54 of the platform 44 upstream from the leading edge 46. The method may further include flowing the cooling media through cooling passages 70 that provide fluid communication from the trenches 60 through the top surface 54 of the platform 44. In particular embodiments, the method may include flowing the cooling media from specific portions of the cavity 58 to one or more chambers 64 in the plenum 62 between the cavity 58 and the trenches 60 and then flowing the cooling media from specific chambers 64 in the plenum 62 to specific trenches 60 to vary the pressure and/or flow rate of cooling media supplied to the trenches 60. In other particular embodiments, the method may include flowing the cooling media through trenches 80 beneath the top surface 54 of the platform 44 downstream from the leading edge 46 and adjacent to the convex surface 50 of the airfoil.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An airfoil, comprising:
   a. an outer surface having a leading edge, a trailing edge downstream from the leading edge, and a convex surface between the leading and trailing edges;
   b. a cavity inside the outer surface;
   c. a platform connected to the outer surface, wherein the platform defines a top surface around at least a portion of the outer surface;
   d. a first plurality of trenches beneath the top surface of the platform upstream from the leading edge, wherein each trench in the first plurality of trenches is in fluid communication with the cavity inside the outer surface;
   e. a first plurality of cooling passages that provide fluid communication from the the first plurality of trenches through the top surface of the platform; and
   f. a plenum defined inside the platform in fluid communication with the cavity and the first plurality of trenches, wherein the plenum includes a plurality of separate chambers, wherein each trench in the first plurality of trenches is in fluid communication with the plenum.

2. The airfoil as in claim 1, wherein the first plurality of cooling passages are staggered transversely across the top surface of the platform.

3. The airfoil as in claim 1, wherein the first plurality of trenches are substantially parallel with the top surface of the platform upstream from the leading edge.

4. The airfoil as in claim 1, wherein the top surface of the platform above the first plurality of trenches comprises a thermal barrier coating.

5. The airfoil as in claim 1, further comprising a first plurality of supply passages that provide fluid communication between the cavity and the plurality of separate chambers in the plenum.

6. The airfoil as in claim 1, further comprising a second plurality of supply passages that provide fluid communication between the plurality of separate chambers in the plenum and the first plurality of trenches.

7. The airfoil as in claim 1, further comprising a second plurality of trenches beneath the top surface of the platform downstream from the leading edge and adjacent to the convex surface, wherein each trench in the second plurality of trenches is substantially parallel with the top surface of the platform.

8. The airfoil as in claim 7, further comprising a second plurality of cooling passages that provide fluid communication from the second plurality of trenches through the top surface of the platform.

9. An airfoil, comprising:
   a. an outer surface having a leading edge, a trailing edge downstream from the leading edge, and a convex surface between the leading and trailing edges;
   b. a cavity inside the outer surface;
   c. a platform connected to the outer surface, wherein the platform defines a top surface around at least a portion of the outer surface;
   d. a plenum inside the platform in fluid communication with the cavity, wherein the plenum includes a plurality of separate chambers;

e. a first plurality of trenches beneath the top surface of the platform upstream from the leading edge, wherein each trench in the first plurality of trenches is substantially parallel with the top surface of the platform and in fluid communication with the plenum; and f. a first plurality of cooling passages that provide fluid communication from the first plurality of trenches through the top surface of the platform.

10. The airfoil as in claim 9, Wherein the first plurality of cooling passages are staggered transversely across the surface of the platform.

11. The airfoil as in claim 9, wherein the top surface of the platform above the first plurality of trenches comprises a thermal barrier coating.

12. The airfoil as in claim 9, further comprising a second plurality of trenches beneath the top surface of the platform downstream from the leading edge and adjacent to the convex surface, wherein each trench in the second plurality of trenches is in fluid communication with the cavity.

13. The airfoil as in claim 12, further comprising a second plurality of cooling passages that provide fluid communication from the second plurality of trenches through the top surface of the platform.

14. A turbine, comprising:
   a. a casing;
   b. a plurality of airfoils circumferentially arranged inside the casing, wherein each airfoil includes an outer surface having a leading edge, a trailing edge downstream from the leading edge, and a convex surface between the leading and trailing edges;
   c. a cavity inside each airfoil;
   d. a platform connected to the outer surface of each airfoil, wherein each platform defines a top surface around at least a portion of the outer surface of each airfoil;
   e. a first plurality of trenches beneath the top surface of each platform upstream from the leading edge, wherein each trench in the first plurality of trenches is in fluid communication with the cavity inside each airfoil;
   f. a first plurality of cooling passages that provide fluid communication from the first plurality of trenches through the top surface of each platform; and
   g. a plenum inside each platform in fluid communication with the cavity inside each airfoil and the first plurality of trenches beneath the top surface of each platform, wherein each plenum includes a plurality of separate chambers in the plenum.

15. The airfoil as in claim 14, Wherein the first plurality of cooling passages are staggered transversely across the top surface of each platform.

16. The airfoil as in claim 14, further comprising a second plurality of trenches beneath the top surface of the platform downstream from the leading edge and adjacent to the convex surface, wherein each trench in the second plurality of trenches is substantially parallel with the top surface of the platform.

* * * * *